(12) United States Patent
Sakthivel et al.

(10) Patent No.: US 12,517,286 B2
(45) Date of Patent: Jan. 6, 2026

(54) METHOD OF PRODUCING SINGLE LAYER OMNIDIRECTIONAL BROADBAND ANTIREFLECTIVE AND SUPER HYDROPHILIC (ANTIFOGGING) COATINGS FOR SOLAR AND OTHER APPLICATIONS

(71) Applicant: INTERNATIONAL ADVANCED RESEARCH CENTRE FOR POWDER METALLURGY AND NEW MATERIALS (ARCI), Gurgaon (IN)

(72) Inventors: Shanmugasundaram Sakthivel, Hyderabad (IN); Srinivasa Rao Atchuta, Hyderabad (IN); Easwaramoorthi Ramasamy, Hyderabad (IN); Narendra Chundi, Hyderabad (IN); Madiwala Shiva Prasad, Hyderabad (IN)

(73) Assignee: INTERNATIONAL ADVANCED RESEARCH CENTRE FOR POWDER METALLURGY AND NEW MATERIALS (ARCI), Gurgaon (IN)

( * ) Notice: Subject to any disclaimer, the term of this patent is extended or adjusted under 35 U.S.C. 154(b) by 431 days.

(21) Appl. No.: 18/254,847

(22) PCT Filed: Nov. 25, 2021

(86) PCT No.: PCT/IN2021/051099
§ 371 (c)(1),
(2) Date: May 26, 2023

(87) PCT Pub. No.: WO2022/113108
PCT Pub. Date: Jun. 2, 2022

(65) Prior Publication Data
US 2024/0302571 A1 Sep. 12, 2024

(30) Foreign Application Priority Data
Nov. 27, 2020 (IN) .............................. 202011051833

(51) Int. Cl.
G02B 1/111 (2015.01)
C09D 5/00 (2006.01)
(Continued)

(52) U.S. Cl.
CPC .............. G02B 1/111 (2013.01); C09D 5/006 (2013.01); C09D 7/20 (2018.01); C09D 7/62 (2018.01);
(Continued)

(58) Field of Classification Search
CPC ................................................ C09D 101/284
See application file for complete search history.

(56) References Cited

U.S. PATENT DOCUMENTS 8,182,865 B2    5/2012  Eriksson et al.
2001/0050741 A1* 12/2001 Hokazono ................ G02B 1/11
                                                       349/137
(Continued)

FOREIGN PATENT DOCUMENTS

EP      2625313         8/2013
EP      2625313 B1 *   12/2020  ........... H10F 77/315
WO      2012/047422     4/2012

OTHER PUBLICATIONS

International Search Report dated Feb. 18, 2022, in PCT/IN2021/051099, 3 pages.
(Continued)

Primary Examiner — Paul C Lee
(74) Attorney, Agent, or Firm — Grüneberg and Myers PLLC

(57) ABSTRACT

An omnidirectional broadband antireflective with a super hydrophilicity (antifogging) coating composition, and a cor-
(Continued)

responding method of producing and coating on a substrate like glass plates and tubes, silicon wafer, or plastics selected from PMMA, PC, and CR-39 lenses, is provided. The composition contains: a) component A, an aqueous or organic solvent selected from DI water, ethanol, n-propanol, isopropanol, isopropoxy ethanol, or a mixture thereof; b) component B, alkaline or acid stabilized silica nanoparticles (highly positively or negatively charged silica nanoparticles), individually or a mixture thereof; and c) component C, an alkylsilane compound selected from 3-glycidoxypropyltrimethoxysilane, 2-glycidoxyethyltrimethoxysilane, 3-glycidoxypropyltriethoxysilane, 2-glycidoxyethyltriethoxysilane, polyethylene glycol tert-octyl phenyl ether, and hydroxypropyl cellulose, individually or mixture thereof. The coating exhibits high optical performance with 3 to 5% average net enhancement from visible to NIR region (300-1500 nm) on glass substrates and 5.0% to 30.5% from 0-80° incidence.

21 Claims, 8 Drawing Sheets

(51) Int. Cl.
C09D 7/20 (2018.01)
C09D 7/62 (2018.01)
C09D 7/65 (2018.01)
C09D 7/80 (2018.01)
G02B 1/16 (2015.01)

(52) U.S. Cl.
CPC ............... C09D 7/65 (2018.01); C09D 7/80 (2018.01); G02B 1/16 (2015.01)

(56) References Cited

U.S. PATENT DOCUMENTS

2006/0128836 A1* 6/2006 Honda ............... G02B 1/115
 428/421
2008/0057187 A1* 3/2008 Trapp ................ G02B 1/113
 106/287.34
2020/0240011 A1* 7/2020 Kauppinen ............ C23C 16/56

OTHER PUBLICATIONS

Written Opinion dated Feb. 18, 2022, in PCT/IN2021/051099, 5 pages.

* cited by examiner

Figure 6A:
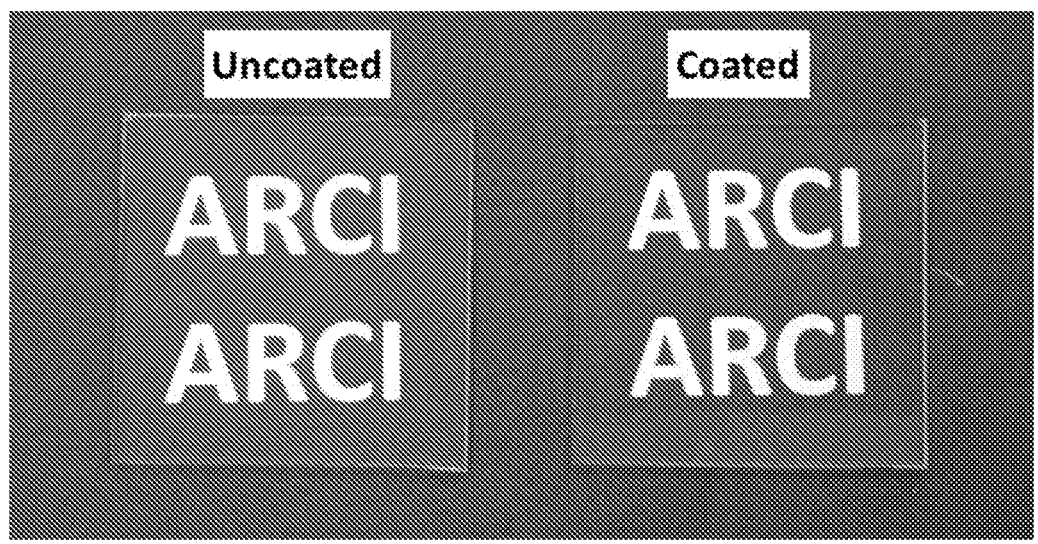

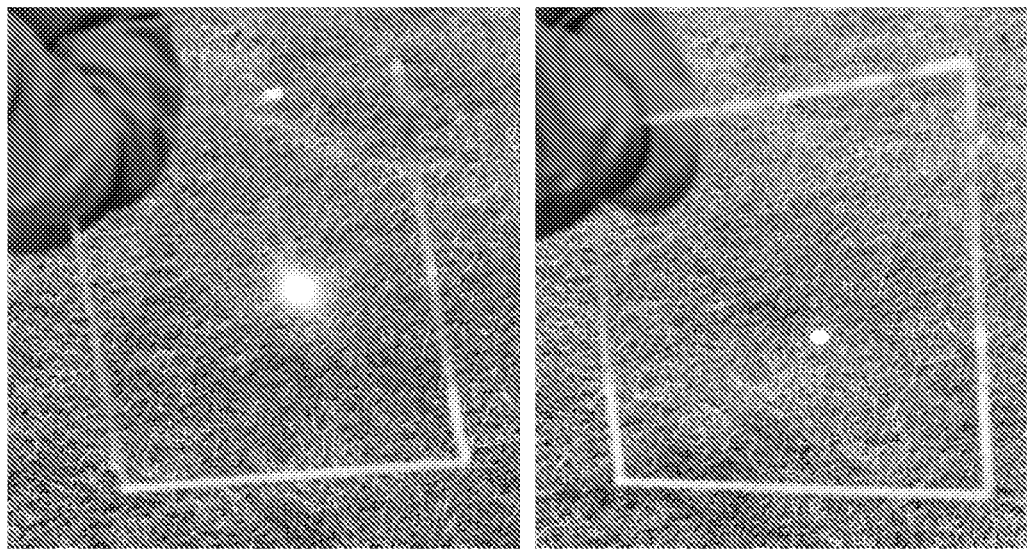
Fig. 6b
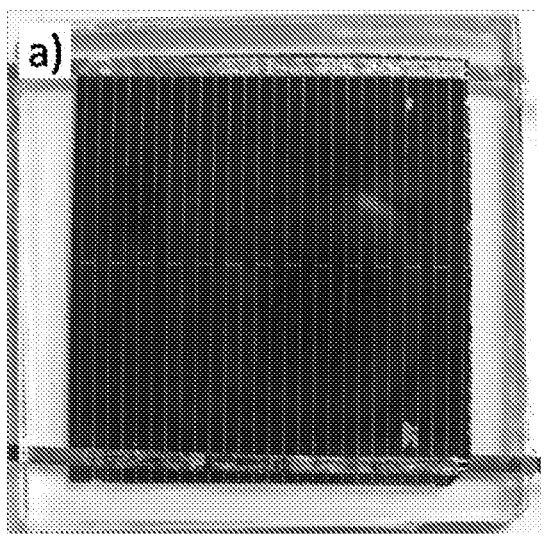 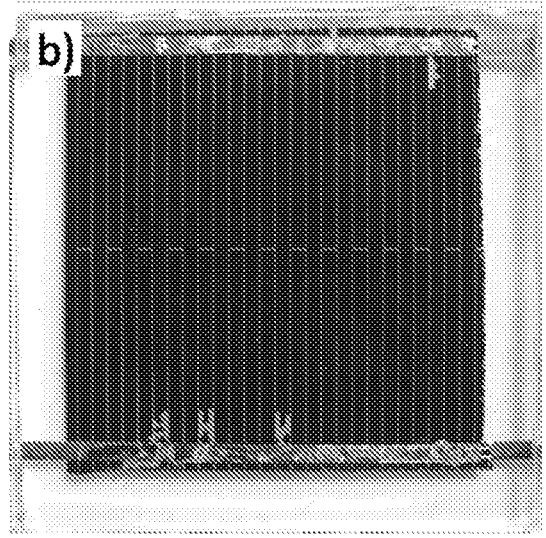
Fig.7a  Fig. 7b

US 12,517,286 B2

METHOD OF PRODUCING SINGLE LAYER OMNIDIRECTIONAL BROADBAND ANTIREFLECTIVE AND SUPER HYDROPHILIC (ANTIFOGGING) COATINGS FOR SOLAR AND OTHER APPLICATIONS

CROSS-REFERENCE TO RELATED APPLICATIONS

This application is the National Stage entry under § 371 of International Application N$_o$. PCT/IN2021/051099, filed on Nov. 25, 2021, and which claims the benefit of priority to Indian Application No. 202011051833, filed on Nov. 27, 2020. The content of each of these applications is hereby incorporated by reference in its entirety.

FIELD OF THE INVENTION

The invention relates to omnidirectional broadband antireflective with super hydrophilicity (antifogging) coating composition for solar and other applications. Significantly, the invention is focused on developing an angle-independent Antireflective coating to minimize the losses of Fresnel reflections and losses due to angle of incidence. Accordingly, we have developed a single layer omnidirectional broadband antireflective and super hydrophilic (Antifogging) coatings for solar and other applications. Said coating on glass substrate exhibits enhancement of 5 to 30.5% transmittance by the varying angle of incidence ranging from 10 to 80° in the wavelength range of 380-1100 nm along with high mechanical, UV, and weather stability.

The coating is also attributed to the super hydrophilic (Antifogging) property, resulting in easy cleaning of photovoltaic modules and other devices to improve their performance. Hence, they can be used for solar thermal collectors, solar panels, architectural glasses, windscreens, high power lasers, UV and IR windows, and video display panels. These coatings can be applied on any substrates for transparent and opaque materials like glass, plastic, rubber, etc., metals, and ceramics.

BACKGROUND OF THE INVENTION

Highly transparent optical products are used for a wide range of applications, for instance, PV cover glass, glass envelops of absorber tube, automobile glass shields, optical lenses, etc. All these products encounter Fresnel losses due to a gradient in the refractive index. In particular, the solar PV module front surface is covered with a glass that should exhibit high transmission in the wavelength range of 380-1100 nm.

Remarkably, the PV modules require maximum solar power irradiation to obtain high Power conversion efficiency to minimize the Fresnel reflection losses. The outdoor placement of these devices encounters extreme weather conditions and chemical contaminants. Moreover, Solar PV plants are established over a wide range of areas throughout different areas in the world. Therefore, the primary challenge is to encounter harsh weather conditions and to withstand various abrasions during cleaning. Another major challenge is the soiling effect of the PV modules and the corrosion nature of cover glass plates, reducing the transmission and mechanical cleaning to restore the transmission. The development of omnidirectional broadband antireflective coatings (OBACs) along with super hydrophilic (Antifogging) property, high mechanical, UV, and weather stability has attracted substantial research interest due to their high transmittance in a broad wavelength range (300-2500 nm) for diverse potential applications, viz. spanning photovoltaic systems, solar thermal collectors, optical and architectural glasses, windscreens, high power lasers, windows, and video display panels. The development of high-performance omnidirectional broadband antireflection coatings with super hydrophilic (Antifogging) property has attracted great interest, mainly due to their potential application for a variety of purposes, such as solar thermal collectors, solar cells, architectural glasses, windscreens, high power lasers, UV and IR windows, and video display panels.

In order to achieve minimum reflectance, fine control over coating thickness and refractive index is essential.

$$n_c = (n_o n_s)^{1/2} \qquad (1)$$

Where $n_c$, $n_0$, and $n_s$ are the refractive indices of the coating, the incident medium, and the substrate, respectively. Since the refractive index of most glazing materials of interest for solar and optical applications is 1.47-1.57, any AR coating must comprise a material with a low refractive index value in the range 1.21-1.25 as per Equation (1) (if $n_o$=1). As the above refractive index range is beyond any known solid material, developing dense single-layer AR coatings on any substrate is challenging.

Developing a suitable coating material and coating for the applications mentioned has always been a challenge with desired properties.

Numerous patents and articles describe the development of Antireflective coatings, which significantly function as easy to clean property produced by the wet chemical method.

In this connection, CN104098935 describes the development of antireflective coating. It disclosed a coating composition comprising 0.5~99 wt. % Water and 0.1~20 wt. % Silica particles with an average particle size of 40 nm or less and also 0~20 wt. % Silica particles with an average particle size of 50 nm or greater. The sum of Silica particles weight % is limited to 0.1 to 20 wt. The mineral acid is used to maintain the pH of the solution, and TEOS is added for the same. The pH of the composition is less than 3. The water contact angle is less than 50, and the refractive index of the coating is between 1.2 and 1.4. The transmittance is increased at least by 2%.

CN105440875 discloses a water-based silica sol antireflection coating liquid, which is prepared by mixing raw materials containing an organic solvent type silica sol with a pH value of 2 to 5, water, phosphoric acid, resin, and additives added as needed, wherein the above components the mass parts are as follows: 9-15 parts of organic solvent-based silica sol, preferably 11-13 parts, 78-92 parts of water, 0.01-0.5 parts of phosphoric acid, preferably 0.1-0.3 parts, 0.2-1.5 parts of resin, preferably 0.8-1.2 Parts, and 0 to 2 parts, and preferably 0.01 to 2 parts, of additives added as needed.

CN106892574 disclosed a super-hydrophilic clean silica antireflection film, characterized in that the silica antireflection film has a porous membrane structure with a pore size of 5-8 nm, the membrane layer is a sol-gel acid membrane, and the surface Contains hydroxyl groups, the static water contact angle is less than 5°, the film thickness is 100-200 nm, and the refractive index is between 1.2-1.4.

CN105731821 described a super-hydrophilic, antireflection, and moisture-proof composite film on a glass substrate. This coating comprises $SiO_2$ and $TiO_2$ nanoparticles with an average particle size of 37 nm to 99 nm. It revealed silica/titania composite film has antireflective properties, and the glass substrate with the silica/titania composite film on the surface has an optical wavelength of 380 nm to 1200 nm. The highest light transmittance of the area is increased from 92.1% of the blank glass substrate to 99.3%, and the average light transmittance in the visible light wavelength region of 380 nm to 780 nm is increased from 91.8% the blank glass substrate to 98.6% at 380 nm. The average transmittance in the visible near-infrared light wavelength region of 1100 nanometres increased from 92.0% of the blank glass substrate to 97.5%. The water contact angle ranges from 0-1°

CN108516697 discloses a method for preparing a super-hydrophilic antireflective coating at room temperature, 1 to 100 parts by weight of surfactant, 1,000 to 20,000 parts by weight of deionized water, 20 to 300 parts by weight 1 part catalyst, and 1000~20000 parts by weight alcohol solvent are mixed to prepare a mixed solution A; 1~1000 parts by weight of ethyl orthosilicate and 0~1000 parts by weight of ethanol are mixed and stirred evenly to prepare to obtain the mixed solution B, and the mixed solution A is dropped into the mixed solution B and the reaction is stirred for 0.5 to 10 hours. The material is discharged to obtain a mesoporous diameter. The $SiO_2$ spherical nanoparticle sol solution product of 3 to 200 nm is mixed with 1 to 20 parts by weight of pore-forming agent and 1 to 100 parts by weight of film-forming aid. The mixture is applied to the glass and sinter at 300° C. to 600° C. to obtain a super-hydrophilic antireflection coating. The thickness of the disclosed super hydrophilic (Antifogging) antireflection layer is 200-500 nm.

JP2011530401 disclosed a coating composition comprises a) 0.5 to 99 wt. % water b) 0.1 to 20 wt. % acicular silica particles; c) a sufficient amount of an acid having a pKa of <5 to reduce the pH to less than 5; d) 0 to 20 percent by weight of a tetra alkoxysilane, relative to the amount of the silica nanoparticle e) 0 to 50 percent by weight of a polymeric binder. The coating has a thickness of 50-250 nm and a water contact angle <50°. The refractive index is found to be 1.15 to 1.40. The average transmittance (400-700 nm) increases from 88.2% of the substrate to 93.7% with one side coated and 97.5% with both sides coated.

JP2016123928 discloses an aqueous coating liquid containing water, silica particles having an average primary particle diameter of 8 nm or less and negatively charged on the surface, and a polyol-type non-ionic surfactant, and having a pH of 8 to 12 is applied onto a substrate. And a coating film drying step of drying the coating film formed by coating. The reported a change of 2-2.5% in reflectance for coated sample.

US2014272384 discloses an aqueous-based composition where particles have sheet-like morphology with a thickness of 10 nm, and curing the above composition on substrate leads to coating. The coating has a thickness of 100-500 nm. The refractive index is between 1.10-1.50.

WO2016121404 discloses a coating consisting of a binder containing silica as the main component, fine silica particles fixed by the binder, and fine titania particles fixed by the binder and formed on at least a part of one main surface of the glass plate. A reflective coating is provided, and the average transmittance of light having a wavelength in the range of 380 nm to 850 nm in the glass plate with the low reflective coating is used to determine the wavelength range of 380 nm to 850 nm in the glass plate on which the low reflective coating is not formed. The transmittance gain obtained by subtracting the average transmittance of light is 1.7% or more, and the low reflection coating contains 25% by mass to 43% by mass of silica in the binder with respect to the total mass of the low reflection coating, 40% by mass to 64% by mass of the fine silica particles, The particles containing 10 to 20 wt %, the glass plate with low-reflection coatings.

WO2016106022 reveals a suspension comprising of surface-treated silica nanoparticles, i.e., a mixture of hydrophobic and hydrophilic silane, with a water dispensable binder resin and at least one surfactant and at least aqueous solvent.

According to the prior art of invention for the development of antireflective coating, it is quite evident that there are no identifications to develop a combination of omnidirectional broadband antireflective coating with super hydrophilic (Antifogging) property along with high mechanical, UV, and weather stabilities.

Further, most of the prior art of invention used acids and a combination of aqueous and organic-based solvents for the development of antireflective coating solutions. Few prior arts of invention indulge a complicated solution preparation and process for the development of Antireflective coating sol and coating development and could lead to high capital cost and industrial viability.

Furthermore, in some other prior arts provided, the method disclosed has the advantage that the starting materials are non-toxic, harmless reactants. Still, the reactants utilized in the process, such as anhydrous solvents and fluorinated alcohols, are expensive.

Sol-gel-based antireflective coatings method enables the feasibility of scaling up and low cost of production. So, it would be very crucial to develop an omnidirectional broadband antireflective coating for PV panels or solar receiver tubes, or optical devices to reduce reflection off glass over a wide angle of incidence. The coating disclosed in the current invention has high-performance Omnidirectional Broadband Antireflective property, hydrophilic property, and stabilities like high weather stability (Accelerated high-pressure vessel test), mechanical, and UV. Further, the developed Omnidirectional Broadband Antireflective Coatings (OBAC) disclosed here enhances the transmission of the glass with varying light incidence angles that increases the power conversion efficiency of the solar PV module. Moreover, the compositions are very uniform and highly stable with a longer shelf life period, and the synthesis of coatings sol and development of coating is an Industrially scalable and cost viable technique.

SUMMARY OF THE INVENTION

The present invention provides a method of producing single-layer AR coating having high-performance omnidirectional Broadband Antireflective property in a broad solar wavelength range (300-1500 nm) along with hydrophilic property and stabilities like high weather stability (accelerated high vapor pressure test), mechanical, and UV.

According to various embodiments of the invention, the primary objective of the invention is to develop an aqueous/organic-based antireflective coating sol with high homogeneity suitable for easy and industrial viable coating techniques (dip, spray, roll to roll, etc.).

The second objective of the inventions is to establish coating on various substrates selected from transparent materials like glass, plastic lenses, and solar absorber coated substrate (plates and tubes) to achieve high Omnidirectional Broadband Antireflective along with super-hydrophilic properties and stabilities like high weather stability (Accelerated high-pressure vessel test), mechanical, and UV. These coatings are ideal for soda-lime and borosilicate glasses for imparting super hydrophilic (Antifogging) property and mechanical, UV, weather, and thermal stabilities.

The third objective of the invention is to provide an Omnidirectional Broadband Antireflective with varying light incidence angles, which can be measured by using UV-Vis-NIR spectrophotometer using a unique accessory of Universal measurement accessory (UMA). This has application in the Photovoltaic Modules, and its performance can be assessed by standard test conditions and outdoor field conditions.

According to the first embodiment under the present invention, there is provided a method for the production of Omnidirectional Broadband Antireflective Coatings (OBACs) sol in the form of 2 different types nanoparticles colloidal suspension with high electrostatic stabilization comprising of: a) acid stabilized and aqueous dispersed (highly positive (+) charged) $SiO_2$ particles range from 5-30 nm; b) alkaline stabilized and dispersed (highly negative (−) charged) $SiO_2$ particles with particles ranging from 7-19 nm and dispersed either aqueous solvent or organic solvents with the combination of high and low boiling solvents preferably alcohol-based polar solvents and further incorporation of the binding compound in prescribed relative proportions to obtain the controlled amount of pores in the OBAC film having nanopores in the range from 5 to 15 nm.

According to the second embodiment of the invention, we have established a method of coating on the glass substrates (soda-lime and borosilicate glasses) either one side or both sides with high Omnidirectional Broadband Antireflective property along with super-hydrophilic property and stabilities like high weather stability (Accelerated high-pressure vessel test), mechanical, and UV by a simple and industrially viable coating techniques like dip, roll to roll and spray. The step of applying the coating occurs within a chamber or dust-free room with a humidity range of 35-55%. Following the coating process, the adhered sol on the glass substrate is dried first at 80-100° C. for 15-30 min followed by curing at 100-600° C. for 15 mins-4 h, preferably 500° C. for 1 hour.

According to an exemplary embodiment under the invention, the Omnidirectional Broadband Antireflective Coatings (OBACs) with super hydrophilic (Antifogging) property on glass substrates was produced by using four different compositions using the single inventive concept and found to exhibit enhancement of average transmittance ranging from 5 to 30.5% by varying angle of incidence ranging from 10 to 80° in the wavelength range of 380-1100 nm. Further, the coated glass encapsulated polycrystalline Si solar cell has shown an excellent 3.6-5.6% relative increment in the efficiency compared to that of uncoated glass encapsulated device at standard test conditions and energy gain up to 18.5% in the field (outdoor).

Further, the thickness of the OBACs, according to the invention, is in the range between 125-175 nm and preferably below 175 nm. Similarly, the refractive index of the layers has a range between 1.25-1.35 (at a wavelength of 550 nm) and preferably below 1.35.

Further, according to the invention, the OBACs having nanoporous is in the range between 5 to 10%, preferably below 10%, and the size of the pores is in the range between 5 to 15 nm, preferably <15 nm. The roughness of the film ranges from 82-201 nm, preferably <250±10 nm. Due to the presence of nanopores in the films, OBACs exhibit excellent super hydrophilic (Antifogging) properties. The contact angle of water on the coating surface becomes <5° observed within 1 sec. The coating becomes super hydrophilic (Antifogging) and shows antifogging properties even after drying under ambient conditions. The super-hydrophilic (Antifogging) property results in easy cleaning of photovoltaic modules and other devices, thereby improving performance.

An accelerated high-pressure vessel test was carried out for OBACs and observed no significant changes in the transmittance.

The coating also exhibits excellent weather and UV stability. No significant changes in the optical and super hydrophilic (Antifogging) properties were noted even after 100 hr weather and UV stability test. A single layer omnidirectional antireflective coating described herein can be applied to devices/objects such as PV cover glass, solar receiver, displays, light screens, automobile windows, an optical window for laser application, etc. The layer attributes excellent omnidirectional property over a wide-angle range.

BRIEF DESCRIPTION OF THE DRAWINGS AND TABLES

These and other features, aspects, and advantages of the present invention will be better understood when the detailed description is read regarding the accompanying drawing.

Figure 1:
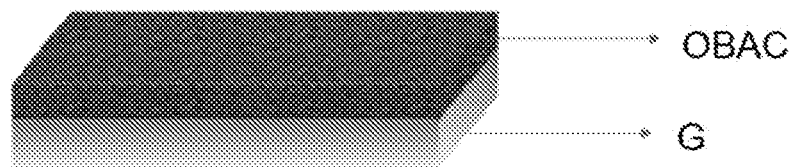

FIG. 1—Pictorial representation of OBAC with super hydrophilic (Antifogging) property indicated by "OBAC," over on glass substrate shown by "G."

Figures 2A, 2B:
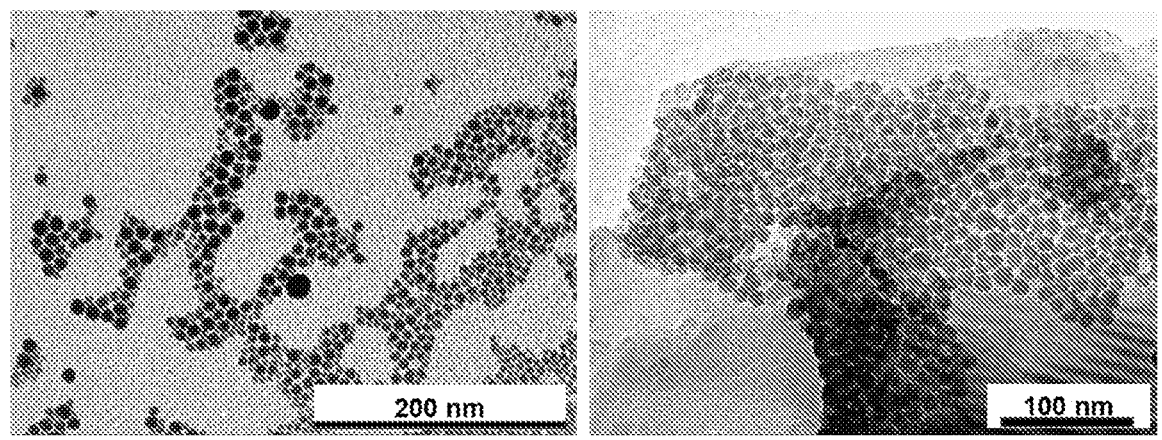

FIG. 2—TEM picture of (a) positively charged and (b) negatively charged $SiO_2$ nanoparticles.

FIG. 3—Transmittance spectra of OBAC at an optimized withdrawal speed on a) soda lime glass b) PV cover glass by using all compositions.

Figure 4:
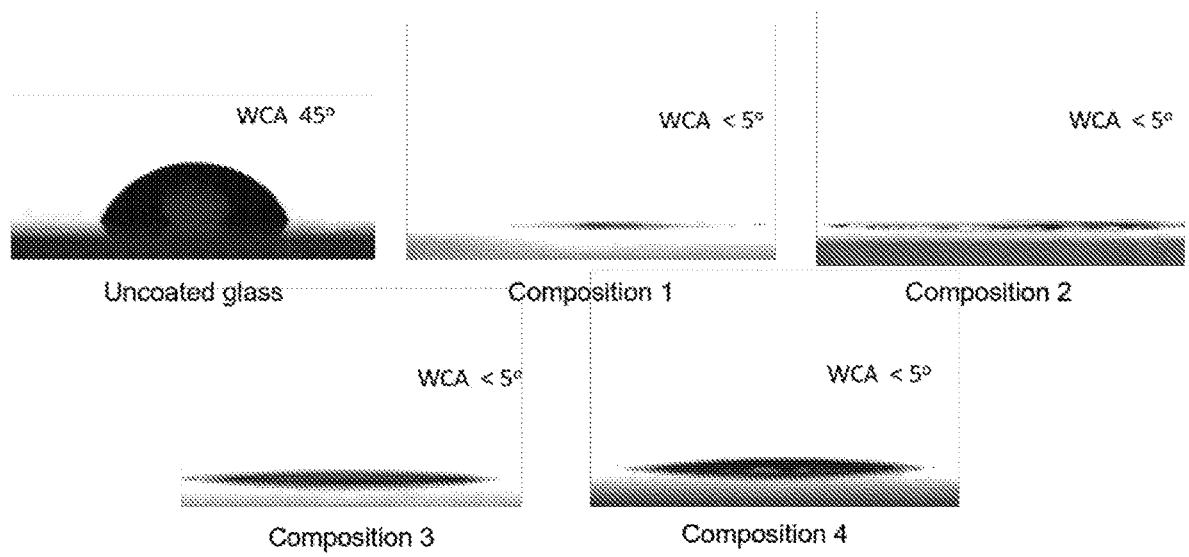

FIG. 4—Super-hydrophilicity of OBAC on PV cover glass for all compositions.

Figure 5:
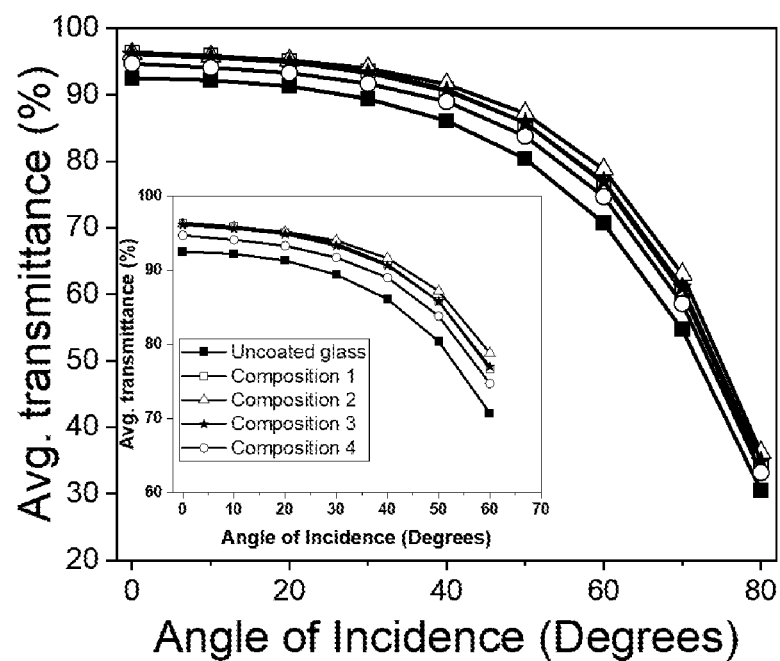

FIG. 5—Avg. Transmittance vs. angle of incidence spectra of antireflection layers at an optimized withdrawal speed on borosilicate using all compositions.

FIG. 6-a) Digital photograph of uncoated and OBAC coated PV cover glasses (50 mm×50 mm) placed above-printed letters 'ARCI.' b) Photograph of reflection phenomenon in uncoated and OBAC coated PV cover glass.

FIG. 7. Photograph of 50 mm×50 mm size crystalline silicon solar minimodule fabricated with a) uncoated and b) OBAC coated PV cover glass.

Figure 8:
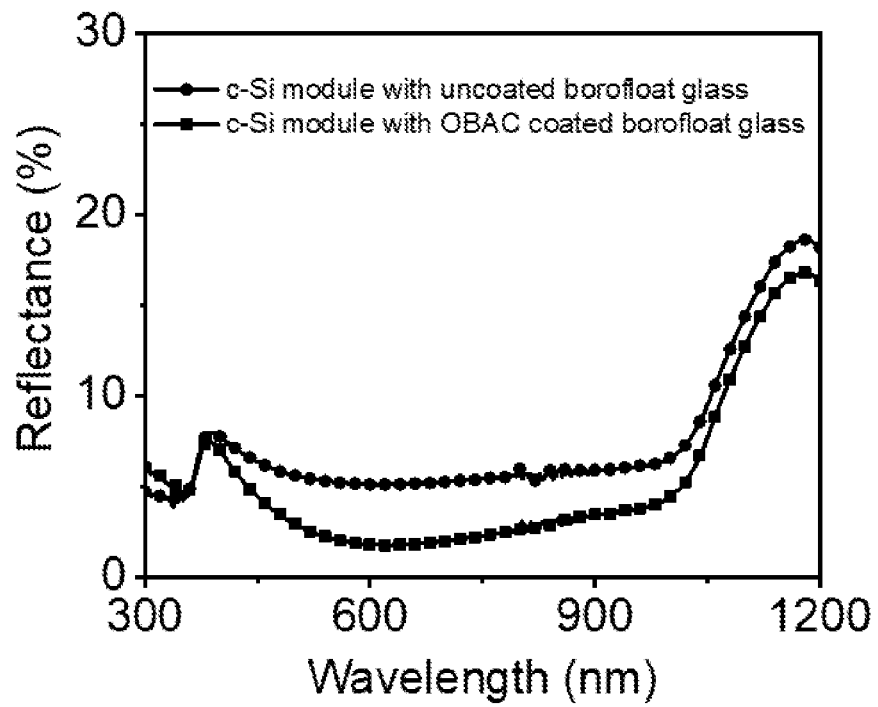

FIG. 8. Reflectance spectra of 50 mm×50 mm size c-Si solar minimodule fabricated with uncoated and OBAC coated PV cover glass.

Figure 9:
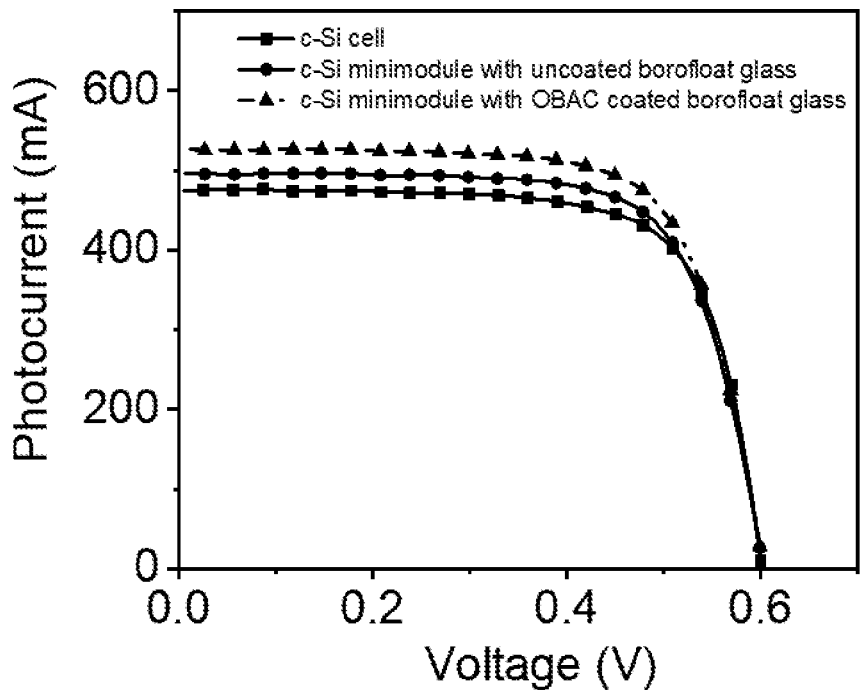
Figure 10A:
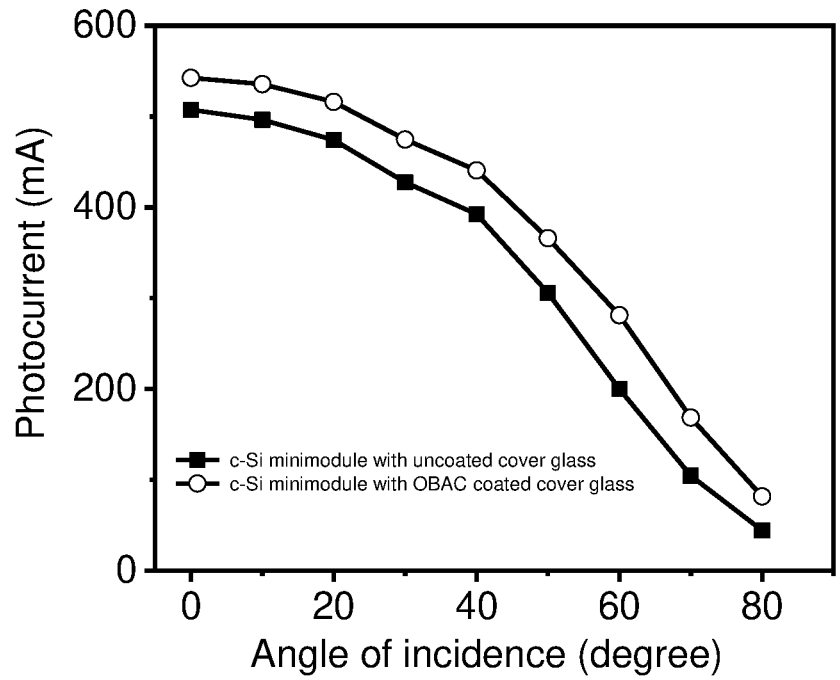
Figure 10B:
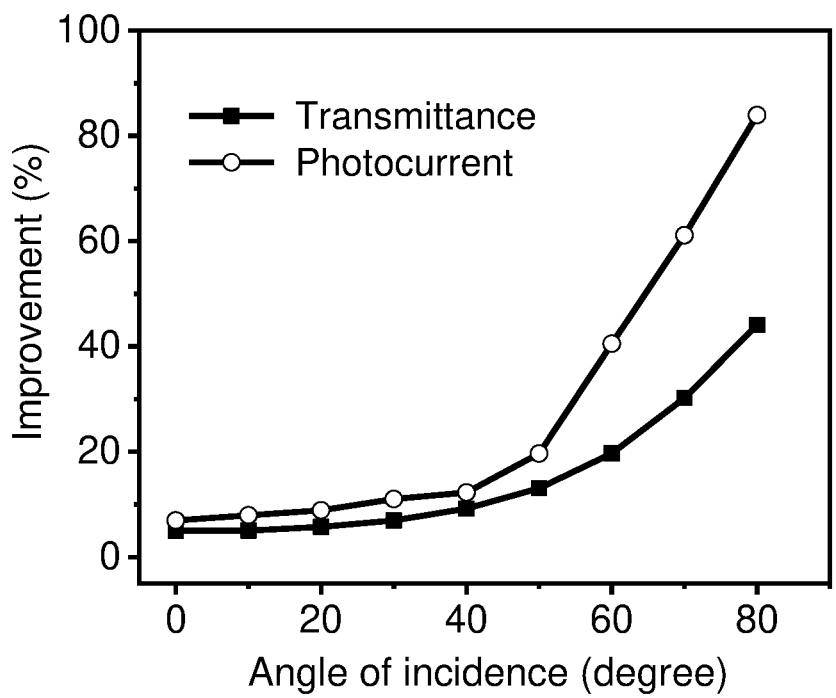

FIG. 9. Current-voltage characteristics of the c-Si solar minimodule fabricated with uncoated and OBAC coated PV cover glass FIG. 10. (a) Photocurrent of c-Si solar minimodule fabricated with uncoated and OBAC coated PV cover glass under one sun illumination for the various angle of incidence (b) Percentage improvement in photocurrent and transmittance of coated PV cover glass for the different angle of incidence FIG. 11. (a) Daytime power output and (b) daily energy yield of c-Si solar minimodule fabricated with uncoated and OBAC coated PV cover glass in an outdoor field.

Figure 12A:
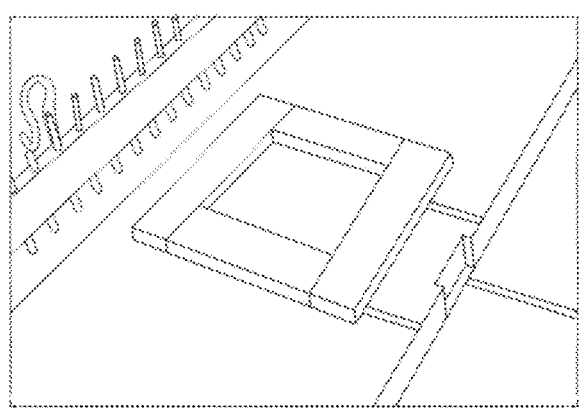

FIG. 12. (a) Mini-module with shadow mask for efficiency measurement, (b) photograph of in-house developed instrument for evaluating the performance under the various angle of incidence conditions.

Table 1—OBAC sol properties like pH, viscosity, and density of compositions 1, 2, 3, and 4.

Table 2—Transmittance values of OBAC on soda-lime glass plates at different withdrawal speeds developed by using composition 1, composition 2, composition 3, and composition 4.

Table 3—Average transmittance value of all OBAC on soda-lime glass and PV cover glass substrates using compositions 1, 2, 3, and 4 at optimized withdrawal speeds.

Table 4—Average transmittance vs. angle of incidence spectra of OBAC at an optimized withdrawal speed on PV cover glass using compositions 1, 2, 3, and 4.

Table 5—Average Reflectance vs. angle of incidence spectra of OBAC at an optimized withdrawal speed on PV cover glass using compositions 1, 2, 3, and 4.

Table 6—Mechanical stability and accelerated weather stability of all OBAC on PV cover substrates for compositions 1, 2, 3, and 4.

Table 7—Film thickness, Refractive index, and % porosity, Roughness of OBAC at an optimum withdrawal speed developed by compositions 1, 2, 3, and 4.

Table 8—Photovoltaic parameters of c-Si solar cell and minimodules under standard test conditions (Air Mass 1.5 Global, $P_{in}$: 100 mW·cm-2, T: 25° C.)

TABLE 1

| Sample name | Viscosity (mPas) | pH | Density(g/cc) |
|---|---|---|---|
| Composition 1 | 1.4 | 5.8 | 1.27 |
| Composition 2 | 1.5 | 9.9 | 1.28 |
| Composition 3 | 2.9 | 4.0 | 1.09 |
| Composition 4 | 2.7 | 4.1 | 1.09 |

TABLE 2

| | Composition 1 | | Composition 2 | | Composition 3 | | Composition 4 | |
|---|---|---|---|---|---|---|---|---|
| Withdrawal speed (mm/s) | Avg. % T (300-1500 nm) | Avg. % T (380-1100 nm) | Avg. % T (300-1500 nm) | Avg. % T (380-1100 nm) | Avg. % T (300-1500 nm) | Avg. % T (380-1100 nm) | Avg. % T (300-1500 nm) | Avg. % T (380-1100 nm) |
| Bare | 87.7 | 89.6 | 87.7 | 89.6 | 87.7 | 89.6 | 87.7 | 89.6 |
| 1 | 91.6 | 93.1 | 91.6 | 94.5 | 91.3 | 94.2 | 90.9 | 93.5 |
| 2 | 91.5 | 93.6 | 91.8 | 94.6 | 91.8 | 93.7 | 92.0 | 94.0 |
| 3 | 91.3 | 93.3 | 91.7 | 93.6 | 91.9 | 93.3 | 91.6 | 92.6 |

TABLE 3

| | Substrate | | | |
|---|---|---|---|---|
| | Soda-lime | | PV cover glass | |
| Sample | Avg. % T (300-1500 nm) | Avg. % T (380-1100 nm) | Avg. % T (300-1500 nm) | Avg. % T (380-1100 nm) |
| Bare | 87.7 | 89.58 | 92.2 | 92.3 |
| Composition 1 | 91.3 | 93.6 | 96.1 | 97.1 |
| Composition 2 | 91.8 | 94.6 | 96.0 | 96.9 |
| Composition 3 | 91.3 | 94.2 | 95.6 | 96.3 |
| Composition 4 | 92.0 | 94.0 | 95.6 | 96.4 |

TABLE 4

| | Composition 1 | | Composition 2 | | Composition 3 | | Composition 4 | | Uncoated glass |
|---|---|---|---|---|---|---|---|---|---|
| AOI (°) | Avg. % T (380-1100 nm) | NE | Avg. % T (380-1100 nm) | NE | Avg. % T (380-1100 nm) | NE | Avg. % T (380-1100 nm) | NE | Avg. % T (380-1100 nm) |
| 0 | 97.1 | 5.0 | 96.9 | 4.8 | 96.3 | 4.1 | 96.4 | 4.2 | 92.5 |
| 10 | 96.8 | 5.0 | 96.5 | 4.7 | 95.6 | 3.7 | 95 | 3.0 | 92.2 |
| 20 | 96.2 | 5.4 | 95.7 | 4.8 | 94.9 | 3.9 | 94.4 | 3.4 | 91.3 |
| 30 | 95.4 | 6.7 | 94.8 | 6.0 | 93.3 | 4.4 | 92.9 | 3.9 | 89.4 |
| 40 | 93.5 | 8.6 | 92.5 | 7.4 | 90.6 | 5.2 | 90.6 | 5.2 | 86.1 |
| 50 | 89.8 | 11.7 | 88.3 | 9.8 | 85.8 | 6.7 | 85.8 | 6.7 | 80.4 |
| 60 | 82.4 | 16.5 | 80 | 13.2 | 77 | 8.9 | 77.5 | 9.6 | 70.7 |
| 70 | 67.1 | 22.7 | 64.2 | 17.4 | 61.1 | 11.7 | 61.6 | 12.6 | 54.7 |
| 80 | 39.8 | 30.5 | 37.4 | 22.6 | 34.9 | 14.4 | 35.2 | 15.4 | 30.5 |

TABLE 5

| | Composition 1 | | Composition 2 | | Composition 3 | | Composition 4 | | Uncoated glass |
|---|---|---|---|---|---|---|---|---|---|
| AOI (°) | Avg. % R (380-1100 nm) | NE | Avg. % R (380-1100 nm) | NE | Avg. % R (380-1100 nm) | NE | Avg. % R (380-1100 nm) | NE | Avg. % R (380-1100 nm) |
| 0 | 3.4 | 54.7 | 3.9 | 48.0 | 3.8 | 49.3 | 4.6 | 38.7 | 7.5 |
| 10 | 3.4 | 54.7 | 3.9 | 48.0 | 3.8 | 49.3 | 4.6 | 38.7 | 7.5 |
| 20 | 3.8 | 54.8 | 4.4 | 47.6 | 4.4 | 47.6 | 5.1 | 39.3 | 8.4 |
| 30 | 4.9 | 52.4 | 5.6 | 45.6 | 5.5 | 46.6 | 6.3 | 38.8 | 10.3 |
| 40 | 7 | 48.1 | 8 | 40.7 | 7.9 | 41.5 | 8.7 | 35.6 | 13.5 |
| 50 | 10.9 | 42.9 | 12.4 | 35.1 | 12.1 | 36.6 | 13 | 31.9 | 19.1 |
| 60 | 18.7 | 34.6 | 20.9 | 26.9 | 20.4 | 28.7 | 21.5 | 24.8 | 28.6 |
| 70 | 33.8 | 24.0 | 36.5 | 18.0 | 36.1 | 18.9 | 36.7 | 17.5 | 44.5 |
| 80 | 60.2 | 11.9 | 62.4 | 8.6 | 61.8 | 9.5 | 61.8 | 9.5 | 68.3 |

TABLE 6

| Sample name | Pencil hardness | Scotch tape test (ISO) | HT test Avg. % T (380-1100 nm) Before | HT test Avg. % T (380-1100 nm) After |
|---|---|---|---|---|
| Composition 1 | 2H | 1 | 97.1 | 96.5 |
| Composition 2 | 2H | 3 | 96.9 | 96.7 |
| Composition 3 | 2H | 3 | 96.3 | 96.1 |
| Composition 4 | 2H | 1 | 96.4 | 96.2 |

TABLE 7

| Sample name | Thickness (nm) | Refractive index (550nm) | Porosity (%) | Roughness (nm) |
|---|---|---|---|---|
| Composition 1 | 169 | 1.30 | 6.4 | 201 |
| Composition 2 | 116 | 1.34 | 7.3 | 121 |
| Composition 3 | 128 | 1.28 | 9.1 | 82 |
| Composition 4 | 162 | 1.33 | 8.9 | 83 |

TABLE 8

| Device | $V_{OC}$ [V] | $J_{SC}$ [mA·cm−2] | FF | PCE [%] | PCE enhancement [%] |
|---|---|---|---|---|---|
| c-Si cell | 0.601 | 29.98 | 0.72 | 12.93 | — |
| c-Si minimodule with uncoated PV cover glass | 0.602 | 31.08 | 0.72 | 13.47 | — |
| c-Si minimodule with C1 coated PV cover glass | 0.602 | 32.81 | 0.72 | 14.22 | 5.6 |
| c-Si minimodule with C2 coated PV cover glass | 0.602 | 32.68 | 0.72 | 14.16 | 5.1 |
| c-Si minimodule with C3 coated PV cover glass | 0.602 | 32.35 | 0.72 | 14.02 | 4.1 |
| c-Si minimodule with C4 coated PV cover glass | 0.602 | 32.2 | 0.72 | 13.96 | 3.6 |

DETAILED DESCRIPTION OF THE INVENTION

The invention is described in detail in the following description and further illustrated by way of examples. We have disclosed here a method of producing omnidirectional broadband antireflective coatings having high transmittance in a broad solar wavelength (300-1500 nm), with superhydrophilic property and stabilities like high weather stability (Accelerated high-pressure vessel test), mechanical, and UV from highly stabilized nanoparticles suspensions with a high boiling polar organic compound. Two types of stabilized (acid and alkaline-based) nanoparticles suspensions are utilized to develop the Omnidirectional broadband antireflective coating sol, and the coatings produced by these sols attribute to high Omnidirectional broadband antireflective property along with super hydrophilic (Antifogging) property and stabilities like high weather stability (Accelerated high-pressure vessel test), mechanical, and UV.

Type 1 is an acid stabilized and aqueous dispersed $SiO_2$ particle size ranging from 5-30 nm and having approximately 30% solids by weight with a pH of 2.5 with viscosity <7 cP, which is highly positive (+) charged. These $SiO_2$ particles are smooth and spherical. The physical appearance of the dispersion is a clear liquid, slightly more viscous than water. The surface area of the suspension is 180-200 m²/g with a relative density of 1.2 g/cm³.

Type 2 is an alkaline stabilized and uniformly dispersed $SiO_2$ nanoparticles with a 7-19 nm particle size. (pH 9.5-10.1) is highly negative (−) charged is having opalescent appearance with a relative density of 1.21 g/cm³. The surface area ranges from 200-250 m²/g.

The $SiO_2$ nanoparticles mixed with DI water/organic solvent with the addition of polymeric surfactant/polymeric binder/organic binder, preferably Polyethylene glycol tert-octyl phenyl ether, Hydroxypropyl cellulose, and 3-glycidoxypropyltrimethoxysilane to enhance the possible dispersion of the silica particles and with the addition of a high boiling polar organic compound to the mixture results in high uniformity and long shelf-life period of the compositions. The surface morphology of 2 types of $SiO_2$ nanoparticles is shown in FIG. 2.

According to a preferred embodiment under the invention, in the omnidirectional broadband antireflective coating, aqueous-based sols (C1 & C2) comprised of acid stabilized colloidal silica (highly positive (+) charged) $SiO_2$ nanoparticles or alkaline stabilized (highly negative (−) charged) $SiO_2$ particles:DI water:isopropoxy ethanol (IPETOH):Polyethylene glycol tert-octylphenyl ether in the range of ratio 5 to 10:85 to 95:1 to 10:0.1 to 1.

According to a preferred embodiment under the invention, in the omnidirectional broadband antireflective coating, organic solvent-based compositions (C3 & C4) comprised of acid stabilized (highly positive (+) charged) $SiO_2$:Isopropyl alcohol (IPA):isopropoxy ethanol (IPETOH):Hydroxypropyl cellulose/3-glycidoxypropyltrimethoxy silane in the range of ratio 5 to 15:50 to 75:10 to 40:0.1 to 4.

According to a preferred embodiment under the invention, in the omnidirectional antireflective coating composition 1 comprises of acid stabilized colloidal silica (highly positive (+) charged) $SiO_2$ nanoparticles:DI water:Isopropoxy ethanol (IPETOH):Polyethylene glycol tert-octyl phenyl ether in the range of ratio 5 to 10:88 to 95:3.1 to 10:0.2 to 1 and preferably 7.9:85.6:6.0:0.5 (Wt. %).

According to a preferred embodiment under the invention, in the antireflective coating, composition comprises of alkaline stabilized and dispersed (highly negative (−) charged) $SiO_2$ particles:DI water:isopropoxy ethanol (IPETOH):Polyethylene glycol tert-octyl phenyl ether in the range of ratio 5 to 10:88 to 95:3.1 to 10:0.2 to 1 and preferably 7.9:85.6:6.0:0.5 (Wt. %).

According to a preferred embodiment under the invention, the antireflective coating composition 3 comprised of acid stabilized (highly positive (+) charged) $SiO_2$:Isopropyl alcohol (IPA):isopropoxy ethanol (IPETOH):Hydroxypropyl cellulose in the range of ratio 5 to 15:52.6 to 75.8:10 to 42:0.01 to 0.5 and preferably 10.0:60.0:29.9:0.1 (Wt. %).

According to a preferred embodiment under the invention, the antireflective coating composition 4 comprised of: acid stabilized and aqueous dispersed (highly positive (+) charged) $SiO_2$:Isopropyl alcohol (IPA):Isopropoxy ethanol (IPETOH):3-glycidoxypropyltrimethoxy silane in the range of 5 to 14:52 to 73:9 to 42:0.5 to 4 and preferably 7.5:60.3:30.0:2.2 (Wt. %).

The antireflective layer so prepared have omnidirectional and high optical performance in a broad range (300-1500 nm) and exhibit high stability like weather, mechanical, and UV with a thickness in the range of about 100 to 200 nm and have a refractive index value in the range about 1.28 to about 1.34.

The OBAC developed utilizes non-toxic and non-expensive chemicals. Soda-lime, PV cover glass, flexible glass, and FTO glass substrate are coated with OBAC sol for solar application.

The substrate to which the coating sol is applied can be glass, Si-wafer, plastic, solar absorber tube, or any other suitable material. The objects used for coatings are rigid or maybe a flexible type. The substrate can be in any shape; for example, flat, curved, concave, convex, and film-like substrates can also be used. The antireflective layer will cover a top surface or both top and bottom surface or all side surfaces of the objects.

The antireflective layer can be applied as a single layer or multiple layers. The coating sol can be applied to the substrate by any suitable method for single side or double side coating. All methods commonly used with liquid coating agents can be used, including dip, roll to roll, spin, spray, and flow coating.

The applied coating sol is then dried using an oven and followed by curing using a muffle furnace. The temperature and duration of fire-drying are so adjusted that the organic/aqueous solvent contained in the nanoparticles is evaporated. Generally, the drying and curing temperature can be 50° C.-100° C. for polymeric substrate and 100° C.-600° C. for glass substrate.

Generally, the coating liquid can be applied once. Depending on the application, it is also possible to repeat several cycles to obtain the required optical property in the required wavelength region.

Having described the process of the invention in a general way, we will further illustrate the mode of execution and demonstrate the properties of the invention and its practical advantages with the help of the following examples. The present invention is not limited to these examples within the scope thereof.

Example 1

Composition 1 (C1): The coating composition for the antireflection layer was prepared by mixing 7.9 g of acid stabilized (highly positive (+) charged) $SiO_2$ (30 wt %), in 85.6 g of deionized water (DW). The solution is subjected to thorough mixing at room temperature for 2 hours, after which the sol attained a stable suspension. Then 0.4 g of Polyethylene glycol tert-octylphenyl ether is added to the mixture and stirred for 3 hours. After complete mixing of 6.1 g isopropoxy ethanol (IPETOH) is added to the mixture and stirred for 3 hours. The prepared coating sol comprised of acid stabilized colloidal silica (highly positive (+) charged) $SiO_2$ nanoparticles:DI water:isopropoxy ethanol (IPETOH): Polyethylene glycol tert-octylphenyl ether in the ratio 7.9: 85.6:6.0:0.5 (wt %). Further, the prepared composition is highly uniform stable, which in turn results in longer shelf life. The obtained composition has a density of 1.27 g/cc, a viscosity of 1.4 mPas, and a pH of 5.8, as shown in table 1.

The coating composition for the antireflection layer was transferred to the dip-coating container. The PV cover glass substrate for the antireflection coating development was clamped to the vertically movable arm. The temperature within the coating room was controlled in the range 20-30° C., and the humidity within the coating room has controlled the range of 40-55%. The substrate was then lowered into the composition and kept submerged for 1 min, after which it was withdrawn at speed in the range of about 1-4 mm per second, preferably 2 mm per second. After removing, the coating on the substrate was found to be clear, uniform, and transparent.

Thereafter, the substrate with the omnidirectional broadband antireflection layer was transferred to an oven and dried first at 100° C. for 15 min followed by curing the samples at 500° C. for 1 hour.

The antireflective layer thickness is optimized on a soda-lime glass substrate by determining the Antireflective property at normal incidence. The thickness is optimized by varying the withdrawal speed from 1-3 mm/sec.

According to the spectral data, the average transmittance values in the broadband range (300-1500 nm) on soda-lime glass was found to be 91.6, 91.5, and 91.3 for 1 mm, 2 mm, and 3 mm, respectively, compared to 87.7 of uncoated glass and the maximum average solar transmittance values in solar PV active range (380-1100 nm) was found to be 93.1, 93.6, and 93.3 for 1 mm, 2 mm and 3 mm, respectively compared to 89.6 of uncoated glass as the values are provided in table 2. As a result, 3.6 to 3.9% average net enhancement in transmittance for the Solar PV active region from 380-1100 nm and 3.5 to 4.0% average net enhancement in transmittance for the active solar region from 300-1500 nm region were observed.

Figure 3A:
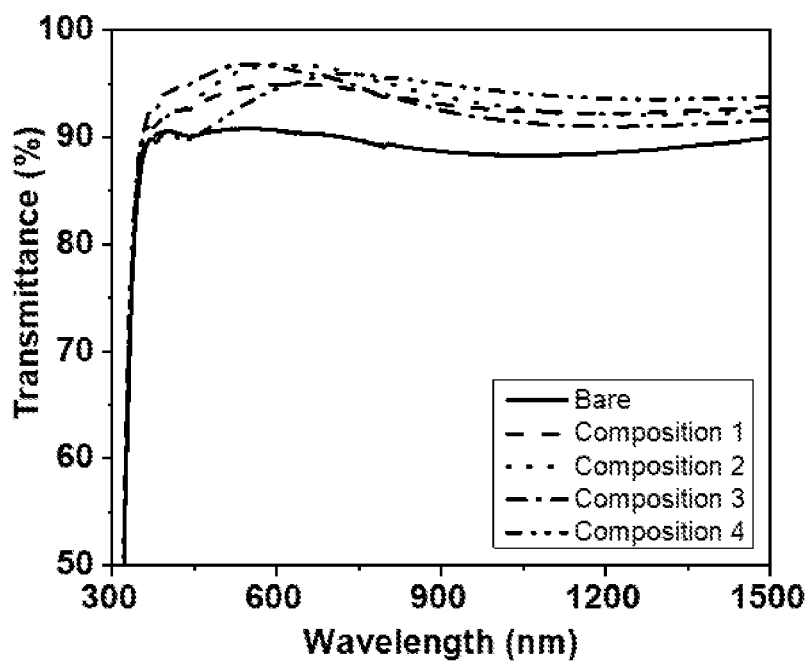
Figure 3B:
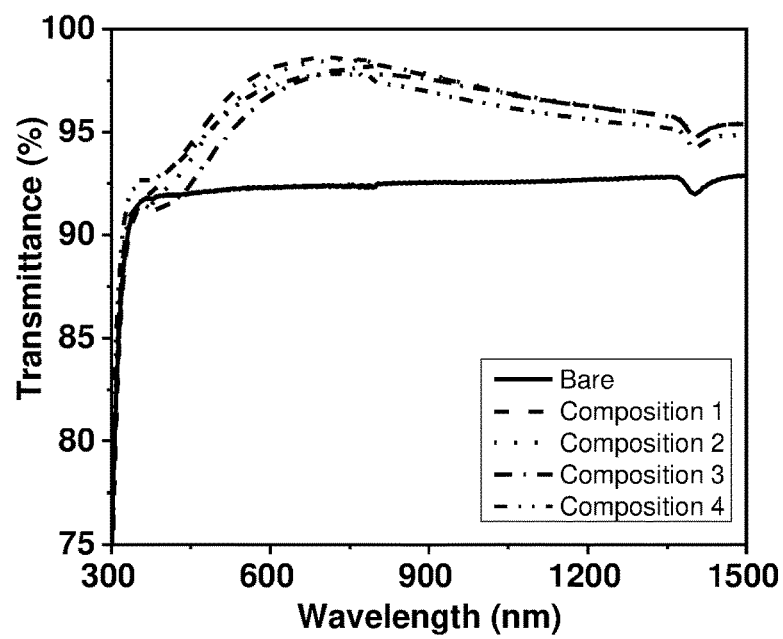

The omnidirectional Antireflective coating is developed on PV cover glass with optimum withdrawal speed obtained from soda-lime glass optimization, as shown in FIG. 3(a). The average transmittance values in the broadband range (300-1500 nm) on PV cover glass was found to be 96.1, compared to 92.2 of uncoated PV cover glass, and the maximum average solar transmittance values in the solar PV active range (380-1100 nm) was found to be 97.1 compared to 92.3 of uncoated glass as shown in FIG. 3(b). The values are provided in table 3. As a result, 3.9% average net enhancement in transmittance from 380-1100 nm and 4.8% average net enhancement in transmittance from 300-1500 nm were observed.

The thickness of the omnidirectional antireflective layers produced by composition 1 was measured by ellipsometer and found to be in the range of 150 to 180 nm, an average of 169 nm. The refractive index of the layer was found to be in the range of 1.26 to 1.35, an average of 1.30 (measured at a wavelength of 550 nm), and the porosity of the film was found to be in the range of 6 to 10%, and an average of 6.4%. The roughness of the coating is measured by a profilometer and found to be around 201 nm, as given in Table 7.

An accelerated high-pressure vessel test was carried out for OBACs by subjecting the samples to high vapor pressure and temperature in a pressure vessel. The samples are placed in a pressure vessel and heated at 121° C. for 1 hour (ISO standard 4802-2:2016), and no significant changes in the transmittance were noted, as shown in table 6.

The adhesion of the coating is analyzed by a crosshatch test. The coating is cut into small squares, thereby reducing lateral bonding, and the coating adhesion is assessed against ISO 2409 and ASTM D 3359 or Corporate Standards. The coating is found to have a rating of 1 as per ISO standards, as shown in table 6.

The pencil hardness test uses the varying hardness values of graphite pencils to evaluate a coating's hardness. The pencil hardness test is perhaps the simplest form of hardness test. Pencils are pushed into the sample, and the coating hardness is identified by the trace generated. The pencil hardness of the coating is found to be 2H, as shown in table 6.

The spectrophotometer equipped with Universal Measurement Accessory (UMA) measures the specular reflectance, transmission, and scattered transmission, reflectance at varied angles ranging from 5 to 85° with different polarizations. Omnidirectional antireflective coatings performance plays a vital role in the PV module performance over a wide angle of incidence. The capability to transmit maximum solar radiation over various incident angles provides the edge over the other AR coatings. The percentage net enhancement (NE) in the average transmission for the wavelength range of 380-1100 nm is 5% to 30.5% from 0-80° incidence compared to that of uncoated glass, and this concludes the noticeable effect of AR coating at higher incidence angles shown in FIG. 5 and the values are provided in table 4.

The percentage net reduction (NR) in the average transmission for the wavelength range of 380-1100 nm is 11.9% to 54.7% from 0-80° incidence compared to that of uncoated glass, as shown in table 5.

Crystalline Silicon wafers of standard size 15.7 cm×15.7 cm are cut and resized into 4 cm×4 cm. The minimodule is developed by encapsulation of Si wafer with the assistance of EVA in PV cover glass of 5 cm×5 cm. The current-voltage characteristics of minimodules under standard test conditions were measured using Solar Simulator and source meter.

The solar weighted average reflectance of minimodule with uncoated PV glass between 300-1100 nm was calculated as 4.8%, and for minimodule with omnidirectional antireflective coated glass is 2.7%. The reflectance is reduced by half, which attributes to better performance, as shown in FIG. 8.

The photovoltaic performance of the c-Si solar cell was found to be enhanced for omnidirectional coated Antireflective glass compared to uncoated glass. The power conversion efficiency for uncoated glass encapsulated and coated glass encapsulated module is 13.47 and 14.22, respectively, as shown in FIG. 9. The coated glass encapsulated minimodule exhibited a relative enhancement of 5.5% compared to that of uncoated glass encapsulated minimodule, as the values are provided in table 8.

Figure 12B:
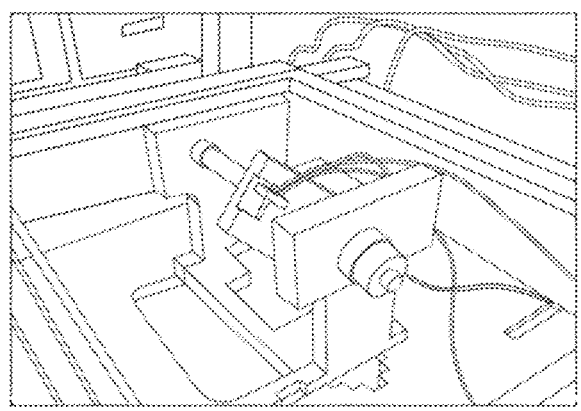

The improvement in the photocurrent generated in omnidirectional broadband antireflective coated glass encapsulated minimodule ranges from 6.3% to 83% from an angle of incidence of 10° to 80° relative to that uncoated encapsulated minimodule. The measurements are made with the help of an indigenously developed accessory, as shown in FIG. 12(b).

Figure 11A:
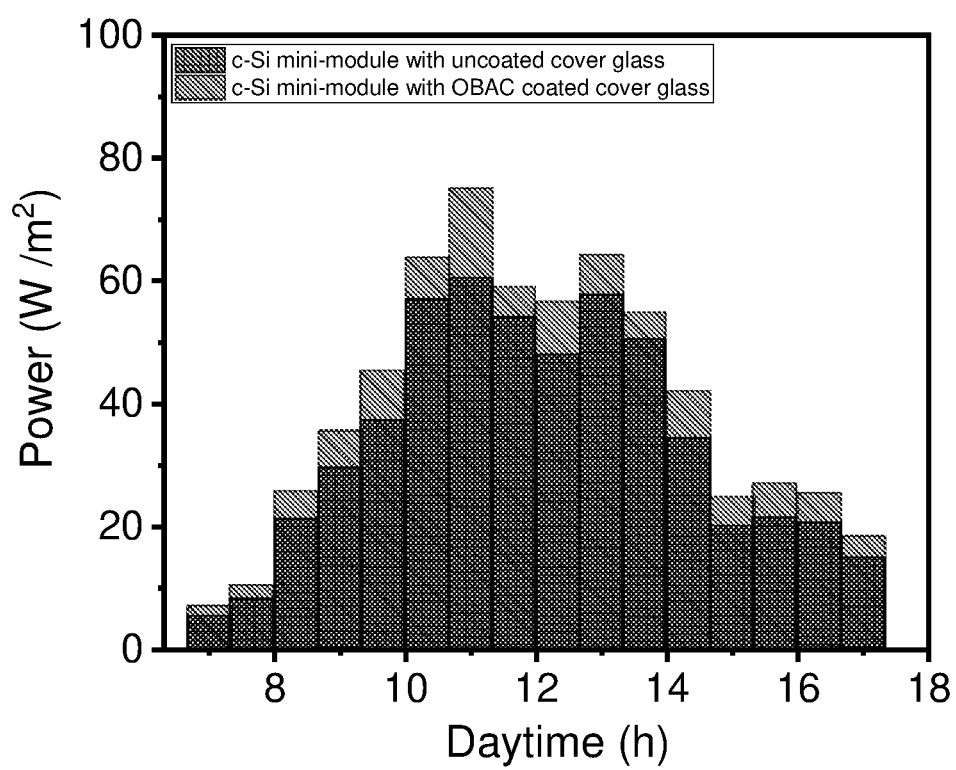
Figure 11B:
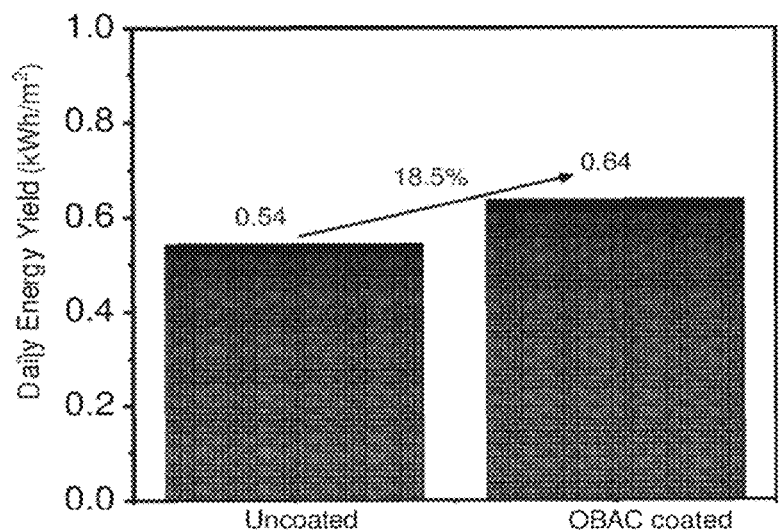

Total energy enhancement in real field conditions was observed to be 18.5% for coated glass encapsulated minimodule compared to that of uncoated glass encapsulated minimodule, as shown in FIG. 11.

Example 2

Composition 2 (C2): The coating composition for the antireflection layer was prepared by mixing 7.9 g of alkaline stabilized (highly negatively (−) charged) $SiO_2$ (30 wt %) in 85.6 g of deionized water (DW). The solution is subjected to thorough mixing at room temperature for 2 hours, after which the sol attained is a stable suspension. Then, 0.4 g of Polyethylene glycol tert-octylphenyl ether, is added to the mixture and stirred for 3 hours. After complete mixing, 6.1 g isopropoxy ethanol (IPETOH) is added to the mixture and stirred for 3 hours. The prepared coating composition comprised of alkaline stabilized and dispersed (highly negative (−) charged) $SiO_2$ particles:DI water:isopropoxy ethanol (IPETOH):Polyethylene glycol tert-octylphenyl ether in the ratio 7.9:85.6:6.0:0.5 (wt %).

After the coating sol preparation (C2), OBAC coating has been established on soda-lime and borosilicate PV glasses by dip-coating process, followed in example 1. After drying and curing, the coating on the substrate was found to be clear, uniform, and transparent.

The coating composition for the antireflection layer was transferred to the dip-coating container, the PV cover glass substrate for the antireflection coating development was clamped to the vertically movable arm. The temperature within the coating room was controlled in the range 20-25° C., and the humidity within the coating room has controlled the range of 40-55%. The substrate was then lowered into the composition and kept submerged for 1 min, after which it was withdrawn at speed in the range of about 1-3 mm per second, preferably 2 mm per second. After removing, the coating on the substrate was found to be clear, uniform, and transparent.

Thereafter, the substrate with the omnidirectional broadband antireflection layer was transferred to an oven and dried first at 100° C. for 15 min followed by curing the samples at 500° C. for 1 hour.

The antireflective layer thickness is optimized on a soda-lime glass substrate by determining the Antireflective property at normal incidence. The thickness is optimized by varying the withdrawal speed from 1-3 mm/sec.

According to the spectral data, the average transmittance values in the Broadband range (300-1500 nm) on soda-lime glass was found to be 91.6, 91.8, and 91.7 for 1 mm, 2 mm, and 3 mm, respectively, compared to 87.7 of uncoated glass, and the maximum average solar transmittance values in solar PV active range (380-1100 nm) was found to be 94.5, 94.6 and 93.6 for 1 mm, 2 mm and 3 mm, respectively compared to 89.6 of uncoated glass as the values are provided in table 2. As a result, 3.9 to 4.1% average net enhancement in transmittance for the Solar PV active region from 380-1100 nm and 4.0 to 5.0% average net enhancement in transmittance for the active solar region from 300-1500 nm region were observed.

The omnidirectional Antireflective coating is developed on PV cover glass with optimum withdrawal speed obtained from soda-lime glass optimization, as shown in FIG. 3(a). The average transmittance values in the broadband range (300-1500 nm) on PV cover was found to be 96.0, compared to 92.2 of uncoated glass, and the maximum average solar transmittance values in the solar PV active range (380-1100 nm) was found to be 96.9 compared to 92.3 of uncoated glass as shown in FIG. 3(b). The values are provided in table 3. In result, 3.8% average net enhancement in transmittance from 380-1100 nm and 4.6% average net enhancement in transmittance from 300-1500 nm were observed.

The thickness of the omnidirectional antireflective layers produced by composition 2 was measured by an ellipsometer and found to be 116 nm. The refractive index of the layers was found to be 1.34 (measured at a wavelength of 550 nm), and the porosity of the film was found to be 7.3 ad the roughness of the coating is measured by profilometer and found to be around 121 nm as shown in table 7. An accelerated high-pressure vessel test was carried out for OBACs by subjecting the samples to high vapor pressure and temperature in a pressure vessel. The samples are placed in a pressure vessel and heated at 121° C. for 1 hour, and no significant changes in the transmittance were noted, as given in table 11. The coating is found to have a rating of 3 as per ISO standards, and the pencil hardness of the coating is found to be 2H, as given in table 6.

The percentage enhancement in the average transmission for the wavelength range of 380-1100 nm is 4.8% to 22.6% from 0-80° incidence compared to that of uncoated glass, and this concludes the noticeable effect of AR coating at higher incidence angles shown in FIG. 5 and the values are provided in table 4.

The percentage net reduction (NR) in the average transmission for the wavelength range of 380-1100 nm is 8.6% to 48% from 0-80° incidence compared to that of uncoated glass as values provided in table 5.

The photovoltaic performance of the c-Si solar cell was found to be enhanced for omnidirectional coated Antireflective glass compared to uncoated glass.

The power conversion efficiency for uncoated glass encapsulated and coated glass encapsulated module is 13.47 and 14.22, respectively, as shown in FIG. 9. The coated glass encapsulated minimodule exhibited a relative enhancement of 5.5% compared to that of uncoated glass encapsulated minimodule, as the values are provided in table 8.

Example 3

Composition 3 (C3): 9.9 g of acid stabilized (highly positive (+) charged) $SiO_2$ is added to the mixture of 59.3 g of Isopropyl alcohol (IPA) and 29.9 grams of isopropoxy ethanol (IPETOH) and stirred for 4 hours. Further, 50 mg of hydroxypropyl cellulose is added into the mixture and stirred for 5 hours. The omnidirectional coating composition is obtained after the completion of stirring. The prepared coating sol composition comprised of acid stabilized (highly positive (+) charged) $SiO_2$:Isopropyl alcohol (IPA):Isopropoxy ethanol (IPETOH):Hydroxypropyl cellulose in the ratio 10.0:60.0:29.9:0.1 (wt %). The omnidirectional coating sol is obtained after the completion of stirring. The obtained composition has a density of 1.09 g/cc and viscosity of 2.9 mPas, and pH of 4.0, as shown in table 1.

After the coating sol preparation (C3), OBAC coating has been established on soda-lime and borosilicate PV glasses by dip-coating process, followed in examples 1 and 2. After drying and curing, the coating on the substrate was found to be clear, uniform, and transparent.

The coating composition for the antireflection layer was transferred to the dip-coating container, the PV cover glass substrate for the antireflection coating development was clamped to the vertically movable arm. The temperature within the coating room was controlled in the range 20-25° C., and the humidity within the coating room has controlled the range of 40-55%. The substrate was then lowered into the composition and kept submerged for 1 min, after which it was withdrawn at speed in the range of about 1-3 mm per second, preferably 1 mm per second. After removing, the coating on the substrate was found to be clear, uniform, and transparent.

Thereafter, the substrate with the omnidirectional broadband antireflection layer was transferred to an oven and dried first at 100° C. for 15 min followed by curing the samples at 500° C. for 1 hour.

The antireflective layer thickness is optimized on a soda-lime glass substrate by determining the Antireflective property at normal incidence. The thickness Is optimized by varying the withdrawal speed from 1-3 mm/sec.

According to the spectral data, the average transmittance values in the broadband range (300-1500 nm) on soda-lime glass was found to be 91.3, 91.8, and 91.9 for 1 mm, 2 mm, and 3 mm, respectively, compared to 87.7 of uncoated glass and the maximum average solar transmittance values in solar PV active range (380-1100 nm) was found to be 94.2, 93.7, and 93.3 for 1 mm, 2 mm and 3 mm, respectively compared to 89.6 of uncoated glass as the values are provided in table 2. As a result, 3.6 to 4.2% average net enhancement in transmittance for the Solar PV active region from 380-1100 nm and 3.7 to 4.6% average net enhancement in transmittance for the active solar region from 300-1500 nm region were observed.

The omnidirectional Antireflective coating is developed on PV cover glass with optimum withdrawal speed obtained from soda-lime glass optimization, as shown in FIG. 3(a). The average transmittance values in the broadband range (300-1500 nm) on PV cover was found to be 95.6, compared to 92.2 of uncoated glass, and the maximum average solar transmittance values in the solar PV active range (380-1100 nm) was found to be 96.3 compared to 92.3 of uncoated glass as shown in FIG. 3(b). The values are provided in table 3. As a result, 3.4% average net enhancement in transmittance from 380-1100 nm and 4.0% average net enhancement in transmittance from 300-1500 nm were observed.

The thickness of the omnidirectional antireflective layers produced by composition 3 was measured by an ellipsometer and found to be 128 nm. The refractive index of the coatings was found to be 1.28 (at a wavelength of 550 nm), and the porosity of the film was found to be 9.1%, and the roughness of the coating is measured by profilometer and found to be around 82 nm as given in Table 7.

An accelerated high-pressure vessel test was carried out for OBACs by subjecting the samples to high vapor pressure and temperature in a pressure vessel. The samples are placed in a pressure vessel and heated at 121° C. for 1 hour, and no significant changes in the transmittance were noted, as shown in table 11. The coating is found to have a rating of 3 as per ISO standards, and the pencil hardness of the coating is found to be 2H, as shown in table 6.

The percentage enhancement in the average transmission for the wavelength range of 380-1100 nm is 4.1% to 14.4% from 0-80° incidence compared to that of uncoated glass, and this concludes the noticeable effect of AR coating at higher incidence angles shown in FIG. 5 and the values are provided in table 4.

The percentage net reduction (NR) in the average transmission for the wavelength range of 380-1100 nm is 49.3% to 9.5% from 0-80° incidence compared to that of uncoated glass, and the values are provided in table 5.

The photovoltaic performance of the c-Si solar cell was found to be enhanced for omnidirectional coated Antireflective glass compared to uncoated glass. The power conversion efficiency for uncoated glass encapsulated and coated glass encapsulated module is 13.47 and 14.02, respectively, as shown in FIG. 9. The coated glass encapsulated minimodule exhibited a relative enhancement of 4.1% compared to that of uncoated glass encapsulated minimodule, as the values are provided in table 8.

Example 4

Composition 4 (C4): 7.5 g of acid stabilized (highly positive (+) charged) $SiO_2$, is added to 59.3 g of Isopropyl alcohol (IPA), and 29.9 g of isopropoxy ethanol (IPETOH) and stirred for 5 hours. Further, 2.14 g of 3-glycidoxypropyltrimethoxy silane is added into the mixture and stirred for 5 hours. The omnidirectional coating composition is obtained after the completion of stirring. The prepared coating sol comprised of: acid stabilized and aqueous dispersed (highly positive (+) charged) $SiO_2$:Isopropyl alcohol (IPA):Isopropoxy ethanol (IPETOH):3-glycidoxypropyltrimethoxy silane in the ratio of 7.5:60.3:30.0:2.2 (wt %). The obtained composition has a density of 1.09 g/cc and viscosity of 2.7 mPas, and pH of 4.1, as shown in table 1.

After the coating sol preparation (C4), OBAC coating has been established on soda-lime and borosilicate PV glasses by dip-coating process, followed in examples 1, 2, and 3. After drying and curing, the coating on the substrate was found to be clear, uniform, and transparent.

The coating composition for the antireflection layer was transferred to the dip-coating container, the PV cover-glass substrate for the antireflection coating development was clamped to the vertically movable arm. The temperature within the coating room was controlled in the range 20-25° C., and the humidity within the coating room has controlled the range of 40-55%. The substrate was then lowered into the composition and kept submerged for 1 min, after which it was withdrawn at speed in the range of about 1-3 mm per second, preferably 2 mm per second. After removing, the coating on the substrate was found to be clear, uniform, and transparent.

Thereafter, the substrate with the omnidirectional broadband antireflection layer was transferred to an oven and dried first at 100° C. for 15 min followed by curing the samples at 500° C. for 1 hour.

The antireflective layer thickness is optimized on a soda-lime glass substrate by determining the Antireflective property at normal incidence. The thickness is optimized by varying the withdrawal speed from 1-3 mm/sec.

According to the spectral data, the average transmittance values in the broadband range (300-1500 nm) on soda-lime glass was found to be 90.9, 92.0, and 91.6 for 1 mm, 2 mm, and 3 mm, respectively, compared to 87.7 of uncoated glass and the maximum average solar transmittance values in solar PV active range (380-1100 nm) was found to be 93.5, 94.0, and 92.6 for 1 mm, 2 mm and 3 mm, respectively compared to 89.6 of uncoated glass as the values are provided in table 2. As a result, 3.2 to 3.9% average net enhancement in transmittance for the Solar PV active region from 380-1100 nm and 3.0 to 4.4% average net enhancement in transmittance for the active solar region from 300-1500 nm region were observed.

The omnidirectional Antireflective coating is developed on PV cover glass with optimum withdrawal speed obtained from soda-lime glass optimization, as shown in FIG. 3(a). The average transmittance values in the broadband range (300-1500 nm) on PV cover was found to be 95.6, compared to 92.2 of uncoated glass, and the maximum average solar transmittance values in the solar PV active range (380-1100 nm) was found to be 96.4 compared to 92.3 of uncoated glass as shown in FIG. 3(b). The values are provided in table 3. As a result, 3.4% average net enhancement in transmittance from 380-1100 nm and 4.1% average net enhancement in transmittance from 300-1500 nm were observed.

The thickness of the omnidirectional antireflective layers produced by composition 4 was measured by ellipsometer and found to be 162. The refractive index of the layers was found to be 1.33 (at a wavelength of 550 nm), and the porosity of the film was found to be 8.9%, and the roughness of the coating is measured by profilometer and found to be around 83 nm as given in Table 7.

An accelerated high-pressure vessel test was carried out for OBACs by subjecting the samples to high vapor pressure and temperature in a pressure vessel. The samples are placed in a pressure vessel and heated at 121° C. for 1 hour, and no significant changes in the transmittance were noted, as provided in table 11. The coating is found to have a rating of 1 as per ISO standards, and the pencil hardness of the coating is found to be 2H, as provided in table 6.

The percentage enhancement in the average transmission for the wavelength range of 380-1100 nm is 4.2% to 15.4% from 0-80° incidence compared to that of uncoated glass, and this concludes the noticeable effect of AR coating at higher incidence angles shown in FIG. 5 and the values are provided in table 4.

The percentage net reduction (NR) in the average transmission for the wavelength range of 380-1100 nm is 9.5% to 38.7% from 0-80° incidence compared to that of uncoated glass, and the values are provided in table 5.

The photovoltaic performance of the c-Si solar cell was found to be enhanced for omnidirectional coated Antireflective glass compared to uncoated glass. The power conversion efficiency for uncoated glass encapsulated and coated glass encapsulated module is 13.47 and 13.96, respectively, as shown in FIG. 9. The coated glass encapsulated mini-module exhibited a relative enhancement of 3.6% compared to that of uncoated glass encapsulated minimodule, as the values are provided in table 8.

We have brought out the novel features of the invention by explaining some of the preferred embodiments under the invention, enabling a person in the art to understand and visualize our invention. It is also to understand that the invention is not limited in its application to the details set forth in the above description or illustrated in the drawings. Although the invention described in considerable detail with reference to certain preferred embodiments thereof, various modifications can be made without departing from the scope of the invention as described herein above and as defined in the appended Claims.

We claim:

1. An omnidirectional broadband antireflective with a super hydrophilicity (antifogging) coating composition, wherein the coating composition comprises:
   a) component A, which is an aqueous or organic solvent selected from the group consisting of deionized (DI) water, ethanol, n-propanol, isopropanol, isopropoxy ethanol, and a mixture thereof;
   b) component B, which is an alkaline or acid stabilized silica nanoparticle (highly positively or negatively charged silica nanoparticles) or a mixture thereof; and
   c) component C, which is an alkylsilane compound selected from the group consisting of 3-glycidoxypropyltrimethoxysilane, 2-glycidoxyethyltrimethoxysilane, 3-glycidoxypropyltriethoxysilane, 2-glycidoxyethyltriethoxysilane, polyethylene glycol tert-octyl phenyl ether, hydroxypropyl cellulose, and a mixture thereof;
   wherein the coating composition has coating thickness in the range of 100-200 nm.

2. The omnidirectional broadband antireflective with a super hydrophilicity (antifogging) coating composition as claimed in claim 1, wherein the coating composition is a composition 1 consisting of acid stabilized colloidal silica (highly positive (+) charged) $SiO_2$ nanoparticles:DI water: isopropoxy ethanol (IPETOH):polyethylene glycol tert-octyl phenyl ether in the range of ratio of 5 to 10:85 to 95:3.1 to 10:0.1 to 1 (wt %).

3. The omnidirectional broadband antireflective with a super hydrophilicity (antifogging) coating composition as claimed in claim 2, wherein said composition 1 consists of acid stabilized colloidal silica (highly positive (+) charged) $SiO_2$ nanoparticles:DI water:isopropoxy ethanol (IPETOH): polyethylene glycol tert-octyl phenyl ether in the ratio of 7.9:85.6:6.0:0.5 (wt %).

4. The omnidirectional broadband antireflective with a super hydrophilicity (antifogging) coating composition as claimed in claim 1, wherein the coating composition is a composition 2 consisting of alkaline stabilized and dispersed (highly negative (−) charged) SiO$_2$ nanoparticles:DI water:isopropoxy ethanol (IPETOH):polyethylene glycol tert-octylphenyl ether in the range of ratio of 5 to 10:85 to 95:3.1 to 10:0.1 to 1.

5. The omnidirectional broadband antireflective with a super hydrophilicity (antifogging) coating composition as claimed in claim 4, wherein said composition 2 consists of alkaline stabilized and dispersed (highly negative (−) charged) SiO$_2$ nanoparticles:DI water:isopropoxy ethanol (IPETOH):polyethylene glycol tert-octyl phenyl ether in the ratio of 7.9:85.6:6.0:0.5 (wt %).

6. The omnidirectional broadband antireflective with a super hydrophilicity (antifogging) coating composition as claimed in claim 1, wherein the coating composition is a composition 3 consisting of acid stabilized (highly positive (+) charged) SiO$_2$ nanoparticles:isopropyl alcohol (IPA):isopropoxy ethanol (IPETOH):hydroxypropyl cellulose in the range of ratio of 5 to 15:52.6 to 75.8:10 to 42:0.01 to 0.5.

7. The omnidirectional broadband antireflective with a super hydrophilicity (antifogging) coating composition as claimed in claim 6, wherein composition 3 consists of acid stabilized (highly positive (+) charged) SiO$_2$ nanoparticles:isopropyl alcohol (IPA):isopropoxy ethanol (IPETOH):hydroxypropyl cellulose in the ratio of 10.0:60.0:29.9:0.1 (wt %).

8. The omnidirectional broadband antireflective with a super hydrophilicity (antifogging) coating composition as claimed in claim 1, wherein the coating composition is a composition 4 consisting of acid stabilized and aqueous dispersed (highly positive (+) charged) SiO$_2$ nanoparticles:isopropyl alcohol (IPA):isopropoxy ethanol (IPETOH):3-glycidoxypropyltrimethoxy silane in the range of 5 to 14:52 to 73:9 to 42:0.5 to 4.

9. The omnidirectional broadband antireflective with a super hydrophilicity (antifogging) coating composition as claimed in claim 8, wherein composition 4 consists of acid stabilized and aqueous dispersed (highly positive (+) charged) SiO$_2$ nanoparticles:isopropyl alcohol (IPA):isopropoxy ethanol (IPETOH):3-glycidoxypropyltrimethoxy silane in the ratio of 7.5:60.3:30.0:2.2 (wt %).

10. A method of producing the omnidirectional broadband antireflective with a super hydrophilicity (antifogging) coating composition as claimed in claim 1, the method comprising:
   a) mixing SiO$_2$ nanoparticles particles in an aqueous or organic solvent or mixture of solvents at room temperature for 1 to 10 hours, to obtain a mixture;
   b) adding polymeric surfactant, polymeric binder, and/or organic binder slowly to said mixture, with stirring for 1 to 10 hours; and
   c) adding a stabilizing agent to the mixture with stirring for 1 to 10 hours, resulting in the omnidirectional broadband antireflective with a super hydrophilicity (antifogging) coating composition.

11. The method of producing the omnidirectional broadband antireflective with a super hydrophilicity (antifogging) coating composition as claimed in claim 10, said method consisting of:
   a) mixing acid stabilized (highly positive (+) charged) SiO$_2$ nanoparticles in deionized water (DW) thoroughly at room temperature for 2 hours, to obtain a mixture;
   b) adding polyethylene glycol tert-octylphenyl ether slowly to said mixture, with stirring for 3 hours; and
   c) adding isopropoxy ethanol (IPETOH) to the mixture with stirring for 3 hours, resulting in composition 1.

12. The method of producing the omnidirectional broadband antireflective with a super hydrophilicity (antifogging) coating composition as claimed in claim 10, said method consisting of:
   a) mixing alkaline stabilised (highly negative (−) charged) SiO$_2$ nanoparticles in deionized water (DW) thoroughly at room temperature for 2 hours, to obtain a mixture;
   b) adding polyethylene glycol tert-octylphenyl ether slowly to said mixture, with stirring for 3 hours; and
   c) adding isopropoxy ethanol (IPETOH) to the mixture with stirring for 3 hours, resulting in composition 2.

13. The method of producing the omnidirectional broadband antireflective with a super hydrophilicity (antifogging) coating composition as claimed in claim 10, said method consisting of:
   a) adding acid stabilized (highly positive (+) charged) SiO$_2$ nanoparticles to a mixture of low boiling solvent of isopropyl alcohol (IPA) with high boiling solvent of isopropoxy ethanol (IPETOH) and stirring for 4 hours; and
   b) adding hydroxypropyl cellulose as a binder, slowly to said mixture, with stirring for 5 hours.

14. The method of producing the omnidirectional broadband antireflective with a super hydrophilicity (antifogging) coating composition as claimed in claim 10, said method consisting of:
   a) adding acid stabilized (highly positive (+) charged) SiO$_2$ nanoparticles to a mixture of low boiling solvent of isopropyl alcohol (IPA) with high boiling solvent of isopropoxy ethanol (IPETOH) and stirring for 4 hours; and
   b) adding 3-glycidoxypropyltrimethoxy silane as binder slowly to said mixture, with stirring for 5 hours.

15. A method of applying the omnidirectional broadband antireflective with super hydrophilicity (antifogging) coating composition prepared by the method as claimed in claim 10, comprising:
   a) cleaning a substrate thoroughly with a mild detergent solution, rinsing with water, and then drying at 100° C. for 10-15 min in an air-oven;
   b) coating a cleaned substrate with the coating composition by a coating technique selected from the group consisting of dip coating, spray coating, spin coating, roll-to-roll coating, and flow coating;
   c) drying a coated substrate at 80-100° C. for 15-30 min in an oven; and
   d) curing a dried coated substrate at 400-600° C. for 2-4 h with a heating rate of 5-10° C./min.

16. The method of applying the omnidirectional broadband antireflective coating composition as claimed in claim 15, wherein the substrate is selected from the group consisting of glass plates and tubes, silicon wafer, and plastic, and
   wherein the plastic is selected from the group consisting of PMMA, PC, and CR-39 lenses.

17. The method of applying the omnidirectional broadband antireflective coating composition as claimed in claim 15, wherein the coating composition has a density in the range of 1.09-1.28 g/cc, viscosity in the range of 1.4-2.9 mPas, and pH in the range of 4.0-9.9.

18. The method of applying the omnidirectional broadband antireflective coating composition as claimed in claim 15, wherein b) comprises dip coating, with a withdrawal speed of 0.5-3 mm/see, and while a hold time is maintained for 60 sec.

19. A substrate coated with an omnidirectional broadband antireflective with super hydrophilicity (antifogging) coating composition, with a coating thickness in the range of 130 to 190 nm over the substrate exhibiting a refractive index of the coating layer in the range of 1.25 to 1.40, and the porosity of the coating layer in the range of 5-10%, the roughness in the range from 82-201 nm, and having enhancement of minimum of 4.1 to 14.4% and a maximum of 5.0 to 30.5% in transmittance by the varying angle of incidence ranging from 10 to 80° in the wavelength range of 380-1100 nm, along with high mechanical, UV, and weather stability.

20. The substrate coated with omnidirectional broadband antireflective with a super hydrophilicity (antifogging) coating composition as claimed in claim 19, wherein the substrate is soda-lime glass, and exhibits 3.2 to 4.2% average net enhancement in transmittance for Solar PV active region (380-1100 nm) and 3 to 5% average net enhancement in transmittance for a broad solar active region (300-1500 nm).

21. The substrate coated with omnidirectional broadband antireflective with a super hydrophilicity (antifogging) coating composition as claimed in claim 19, wherein the substrate is PV cover glass, and exhibits 3.4 to 3.9% average net enhancement in transmittance for Solar PV active region (380-1100 nm) and 4 to 4.8% average net enhancement in transmittance for a broad solar active region (300-1500 nm).

* * * * *